United States Patent [19]

Rastelli et al.

[11] Patent Number: 4,775,396
[45] Date of Patent: Oct. 4, 1988

[54] SELECTIVE ADSORPTION OF $CO_2$ ON ZEOLITES

[75] Inventors: Henry Rastelli, New Fairfield, Conn.; Chien C. Chao, Millwood; Desh R. Garg, Fishkill, both of N.Y.

[73] Assignee: Union Carbide Corporation, Danbury, Conn.

[21] Appl. No.: 117,688

[22] Filed: Nov. 5, 1987

[51] Int. Cl.$^4$ .............................................. B01D 53/04
[52] U.S. Cl. .......................................... 55/58; 55/68; 55/75; 502/79
[58] Field of Search ................... 55/58, 68, 75; 502/79

[56] References Cited

U.S. PATENT DOCUMENTS 3,449,070  6/1969  McDaniel et al. ................ 502/79 X
4,481,018  11/1984  Coe et al. ............................ 55/75 X
4,557,736  12/1985  Sircar et al. ....................... 55/75 X
4,717,398  1/1988  Pearce ................................... 55/58

OTHER PUBLICATIONS

EPC Published Application No. 0173501 A2, Pearce et al, published 3-5-86.

Primary Examiner—Charles Hart
Attorney, Agent, or Firm—Richard G. Miller

[57] ABSTRACT

Carbon dioxide is selectively adsorbed and separated from non-acidic gases such as nitrogen, hydrogen and methane using a pressure swing adsorption process in a fixed adsorption bed containing a faujasite type of zeolitic aluminosilicate containing at least 20 equivalent percent of at least one cation species selected from the group consisting of zinc, rare earth, hydrogen and ammonium and containing not more than 80 equivalent percent of alkali metal or alkaline earth metal cations.

9 Claims, No Drawings

4,775,396

SELECTIVE ADSORPTION OF CO2 ON ZEOLITES

BACKGROUND OF THE INVENTION

1. Field of the Invention

The present invention relates in general to the bulk removal of carbon dioxide from non-acidic gases such as nitrogen and methane, and more particularly to the use of particular cation types of zeolites having the faujasite type of crystal structure as selective adsorbents for the carbon dioxide in a cyclic process wherein desorption is accomplished by a reduction in the bed pressure.

2. The Prior Art

A number of processes for the recovery or removal of carbon dioxide from gas mixtures have heretofore been proposed and practiced on a commercial scale. The processes vary widely, but generally involve some form of solvent absorption, adsorption on a porous adsorbent or diffusion through a semipermeable membrane. The membrane technology is used largely in conjunction with enhanced oil recovery wherein on-site separation of carbon dioxide from methane is carried out in order to provide carbon dioxide for reinjection into the oil-producing formation. In such cases the low capital and equipment costs offset the relatively low $CO_2$ purity and recovery. The solvent absorption systems utilize either chemical or physical solvents and are effective to selectively remove bulk quantities of $CO_2$, although energy requirements are increasingly a cause for concern. For purification processes, $CO_2$ can be effectively removed from gas mixtures containing same using the calcium ion-exchanged form of zeolite A, but because of the strong affinity between the sorbent and adsorbate, thermal energy is required for effective desorption of the $CO_2$. For bulk separations of $CO_2$ from gas mixtures it has more recently been proposed to utilize the alkali metal and/or the alkaline earth metal cation forms of zeolites of the faujasite type, i.e., zeolite X and zeolite Y. Such a process is disclosed in European Patent Application No. 0173501 published Mar. 5, 1986, and utilizes either a pressure swing desorption or a non-sorbable purge gas type of adsorbent regeneration.

SUMMARY OF THE INVENTION

It has now been discovered that the zinc, rare earth, hydrogen or ammonium cationic forms of the zeolites having the faujasite structure are superior to the prior proposed alkali and alkaline earth metal forms thereof for the bulk separation of $CO_2$ from mixtures thereof with non-acidic gases such as methane, hydrogen and nitrogen in which the $CO_2$ content is at least 0.5 mole percent, and preferably at least 5 mole percent. This superiority resides in increased productivity of $CO_2$ in pressure swing adsorption cycles in fixed beds, and exists even though the prior proposed zeolite forms exhibit greater selectivity for the carbon dioxide. Zeolites of the faujasite type having $SiO_2/Al_2O_3$ molar ratios of from 2 to 100, preferably from 2 to 20, and containing at least 20, and preferably at least 40, equivalent percent of one or a mixture of two or more of the aforesaid cation species and not more than 80, preferably not more than 40, equivalent percent of alkali or alkaline earth metal cations, can be employed in fixed bed processes using adsorption temperatures of from about −50° C. to 100° C. and adsorption pressures of from about 0.2 to about 1000 psia. For adsorbent desorption, pressures which are lower than the adsorption pressure and in the range of 0.1 to 500 psia are suitable.

DETAILED DESCRIPTION OF THE INVENTION

Landfill gas is the natural product of the decomposition of organic material in covered landfills. The gas comprises primarily $CO_2$, $CH_4$, $H_2S$, water, nitrogen and oxygen, and is recovered by drilling wells into the landfill in a manner similar to the recovery of natural gas from natural geological formations. The recovered gas is largely methane and carbon dioxide, and after removal of the water, hydrogen sulfide, nitrogen and other impurities, consists of approximately equal parts by volume of $CO_2$ and methane. Separation of the methane from the carbon dioxide is then accomplished by a pressure swing type of fixed bed adsorption process. The adsorbent most commonly employed prior to the present invention was the sodium cation form of zeolite X, the as-synthesized form known commercially as 13X. A typical process operates at ambient temperature, with the feed gas being pressurized to about 450 psia for the adsorption-purification stage. Carbon dioxide is preferentially adsorbed by the adsorbent and the product effluent is methane. When $CO_2$ starts to breakthrough the adsorbent mass, regeneration is accomplished by depressurizing the bed to about 60 psia.

In the production of hydrogen-containing gas streams such as pure hydrogen or hydrogen in admixture with nitrogen (ammonia synthesis gas) it is commonly the case that the source is a hydrogen-containing stream produced by a reaction of a carbonaceous feedstock with steam and or oxygen to produce, inter alia, carbon monoxide and hydrogen, followed by a catalytic shift reaction to convert most of the carbon monoxide to carbon dioxide and produce addiitonal hydrogen. In those instances in which air or oxygen-enriched air is used as the source of oxygen, i.e. a secondary or partial oxidation stage, the raw product gas stream contains nitrogen and other inert gases such as argon. Ammonia synthesis gas manufacture usually employs such a secondary reforming stage to introduce nitrogen into the raw gas product. When the carbonaceous feedstock gas in the steam reforming process is natural gas, about 1 to 5% of the product gas mixture can be nitrogen. In removing the carbon dioxide from such raw gas products it has been proposed to utilize activated carbon. For nitrogen removal, the calcium ion-exchanged forms of both zeolite A and zeolite X have been proposed, the latter having been found by G. Reiss (U.S. Pat. No. 4,477,267) to be far superior to the former.

It has been found that bulk separations of $CO_2$ from methane in such gas mixtures as landfill gases or from other mixtures of $CO_2$ with other non-acidic gases can be carried out with improved results in a pressure swing type of separation process if the temperature is maintained in the range of from −50° C. to +100° C., preferably 20° C. to 50° C., the pressure during the adsorption step is from 2 to 1000 psia and the pressure during the desorption step is below the adsorption pressure and is in the range of from 0.1 to 500 psia, and the zeolite adsorbent employed has a faujasite type of structure, has a $SiO_2/Al_2O_3$ molar ratio of from 2 to 100, and contains at least 20 equivalent percent of one or a mixture of two or more cation species selected from the group consisting of zinc, rare earth, hydrogen and ammonium cations and contains not more than 80 equivalent percent of alkali metal or alkaline earth metal cations.

The faujasite type of zeolite employed can be either of the type X or the type Y. Zeolite X and the method for its preparation is described in detail in U.S. Pat. No. 2,882,244 issued Apr. 14, 1959 to R. M. Milton. The $SiO_2/Al_2O_3$ molar ratio of zeolite X is from about 2 up to 3. In the as synthesized form, zeolite Y has a $SiO_2/Al_2O_3$ molar ratio of from greater than 3 up to 6. The method for synthesizing zeolite Y is disclosed in detail in U.S. Pat. No. 3,130,007 issued Apr. 21, 1964 to D. W. Breck. The forms of zeolite Y which contain molar $SiO_2/Al_2O_3$ values greater than 6 can be prepared by several dealumination techniques well known in the art. For example, high temperature steaming treatments which result in dealumination are reported by P. K. Maher et al. in "Molecular Sieve Zeolites", Advan. Chem. Ser. 101, American Chemical Society, Washington, D. C., 1971, p. 266. A more recently reported procedure, especially useful for increasing the $SiO_2/Al_2O_3$ of zeolite Y, involves dealumination and the substitution of silicon into the dealuminated lattice sites. This process is disclosed in U.S. Pat. No. 4,503,023 issued Mar. 5, 1985 to Skeels et al. As used herein, the term "faujasite type of structure" means the framework structure, irrespective of chemical composition, distribution of the different T-atoms, cell dimensions and symmetry, designated as "FAU" in the ATLAS OF ZEOLITE STRUCTURE TYPES, W. M. Meier and D. H. Olsen, Published by the Structure Commission of the International Zeolite Association (1978).

In the bulk separation of $CO_2$ from $CH_4$, two criteria are of importance, namely the selectivity and the productivity. The selectivity is the degree to which an adsorbent preferentially adsorbs one constituent from a mixture of two or more compositions and is quantified by the separation factor, alpha. In a two-component mixture of gases the separation factor is derived from the binary equilibrium adsorption data. If the composition of the adsorbed phase is the same as the composition of the gas phase, the adsorbent exhibits no selectivity for either component, and the separation factor (alpha) as defined by the following equation, is unity.

$$\text{alpha}_N{}^M = (M_a \times N_g)/(M_g \times N_a)$$

wherein $N_a$ and $M_a$ are the mole fractions of the two adsorbates, N and M, in the adsorbed phase and $N_g$, $M_g$ in the gas phase. For values of alpha greater than unity, $M_a$ represents the preferentially adsorbed constituent, and the higher the value of alpha the greater the selectivity of the adsorbent for the M constituent. The productivity is determined by the difference in the loading of the preferentially adsorbed component at the end of the adsorption stage and at the end of the desorption stage, i.e., the delta-loading or the differential loading of the selectively adsorbed constituent on the adsorbent at its highest partial pressure and at its lowest partial pressure over the course of one adsorption-desorption cycle of the pressure swing process.

As is well-known in the art, it is not presently possible to predict the adsorptive behavior of a gas mixture from the adsorption isotherms of the pure components of the mixture. Calculations based on the ideal circumstances assumed by the Langmuir equation, e.g. the assumption that the surface of the adsorbent is energetically homogeneous, have not been useful because of the disparity between the real and the ideal. For the Langmuir equation to apply, the separation factor would necessarily be independent of the gas pressure and concentration, but it has been amply demonstrated, for example, that in the adsorption of mixtures of nitrogen and oxygen on zeolite adsorbents, the composition of the adsorbed phase varies markedly with changes in pressure. It is essential therefore to find the most advantageous adsorbent for any specific separation process by experimental means.

In carrying out the experimental procedures which led to the present discovery, tests were run at process conditions to simulate the adsorbent performance in a currently practiced pressure swing adsorption cycle for separating $CO_2$ from $CH_4$ in a gas mixture which is both typical of that obtained from a landfill site after initial purification, and representative of other gas mixtures suitably treated in accordance with the process of this invention. The apparatus employed consisted of a stainless steel cylindrical sample cell approximately 1.5 inches long and 0.375 inch in diameter capable of holding between 1 and 2 grams of the test adsorbent and provided with closure means at each end to isolate the cell contents when required during the test procedure. Also at each end of the cell were fittings which permitted the cell to be connected to a conduit for passing a gas stream into the cell during sample activation and during the adsorption procedure, and to carry gas stream effluents from the cell to collection and analytical apparatus. A heating chamber adapted to enclose the cell and control the temperature of the test adsorbent was provided, as well as a gas chromatograph unit equipped with a silica gel column. In carrying out the test procedure the sample cell was filled with the test adsorbent in the form of 20/50 mesh particles and connected into the apparatus system in such a manner that a stream of helium gas at a temperature of 350° C. could be passed through the cell to remove water and other adsorbates contained on the sample initially. (In the case of the silica gel sample the activation temperature was 200° C.) The purge activation was continued for about 16 hours, at which time the cell was cooled to room temperature. The void volume of the cell was determined by measuring the volume of helium effluent from the cell over the period the helium pressure in the cell was decreased from 50 psia to 15 psia. Thereafter the temperature of the cell and its contents were brought to the desired test temperature by adjusting the temperature of the heating chamber and the feedstock mixture of carbon dioxide and methane was passed through the cell at a pressure of about 300 psia for a period of about 30 minutes. A comparison of the composition of the effluent from the cell with the composition of the feedstock was used to determine when adsorption equilibrium had been attained. When equilibrium had been reached the contents of the cell void space and the adsorbed phase on the test adsorbent were collected by heating the cell to 300° C. and passing a helium purge stream through the cell and collecting the effluent in a 2000 cc. syringe collector manufactured by the Hamilton Syringe Company. The contents of the collector were then passed through a silica gel column of a gas chromatograph and the composition of the adsorbate determined. The measurement process at a pressure of about 30 psia was then repeated. Finally the activated weight of the sample adsorbent was determined by difference between the weight of the loaded cell and the weight of the empty cell.

The adsorbent compositions tested in accordance with the foregoing procedure were as follows:

Sample A: Sodium zeolite X having a $SiO_2/Al_2O_3$ molar ratio of 2.6 in the form of 1/16 inch cylindrical pellets bonded with about 20 percent by weight clay:

Sample B: A commercial silica gel manufactured and sold by the Davison Chemical Company, activated at 200° C. in the conventional manner:

Sample C: A zinc-exchanged sodium zeolite X containing 77 equivalent percent $Zn^{+2}$ cations and having a $SiO_2/Al_2O_3$ molar ratio of 2.4:

Sample D: A rare earth exchanged form of zeolite X containing 91 equivalent percent $R.E.^{+3}$ cations:

Sample E: An alumina bonded zeolite Y composition comprising, prior to activation, 80 percent by weight of an 80 percent ammonium ion exchanged zeolite Y having a $SiO_2/Al_2O_3$ molar ratio of 4.9 and bonded with 20 percent by weight alumina:

Sample F: A zinc-exchanged form of zeolite Y having 67 equivalent percent $Zn^{+2}$ cations and a $SiO_2/Al_2O_3$ molar ratio of 5.2:

Sample G: A commercially available form of alumina bonded rare earth exchanged zeolite Y in which the zeolite Y contains about 50 equivalent percent $R.E.^{+3}$ cations and the alumina binder constitutes about 20 percent by weight of the overall composition. The sample particles were 1/16 inch extruded pellets:

Sample H: A zinc exchanged zeolite X containing 84 equivalent percent $Zn^{+2}$ cations and having a $SiO_2/Al_2O_3$ molar ratio of 3.0. This sample was activated under vacuum at 350° C.

The sodium zeolite X sample is representative of the zeolite X-based adsorbents currently most commonly employed in the treatment of landfill gas streams. The silica gel sample was also included for purposes of comparison with commercially available non zeolitic adsorbents which exhibit an adsorptive preference for $CO_2$ over $CH_4$. The results of the experimental runs are set forth below in Table A.

vantage in the practice of the present process. With respect to the adsorbent materials of the present invention, however, it is readily seen that all are superior to the silica gel and the sodium zeolite X compositions in at least one aspect, and most are superior in more than one aspect. The ZnX composition (Sample C) exhibits a markedly higher delta loading for $CO_2$ than NaX does and also has a lower delta loading for $CH_4$. The ZnX of Sample H, which was vacuum activated, has an extremely low delta loading for $CH_4$ and still shows a significantly higher delta loading for $CO_2$ than NaX does. While the REX composition of Sample D is superior to NaX with respect to both $CO_2$ and $CH_4$ delta loadings, it has less of a delta loading for $CO_2$ than the silica gel of Sample B. But the $CH_4$ delta loading of REX is only about one third that of the silica gel adsorbent. REX is also superior to silica gel in absolute loading of $CO_2$. It is readily observed that the ammonium-hydrogen cation form of zeolite Y (Sample E) is vastly superior to all other adsorbents tested with respect to $CO_2$ delta loading, and that Sample F) comprising the zinc-exchanged form of zeolite Y is superior to all other zeolite samples tested except Sample E, and it also shows less than half of the $CH_4$ delta loading of the silica gel material. The REY composition of Sample G possesses a very low $CH_4$ delta loading and a $CO_2$ delta loading far superior to sodium zeolite X.

For the foregoing reasons, the faujasite-type zeolites which have $SiO_2/Al_2O_3$ molar ratios greater than 3 are preferred for use in the present process, with the ammonium-hydrogen cation forms of such zeolites being particularly preferred.

What is claimed is:

1. Cyclic process for selectively separating $CO_2$ from mixtures thereof with non-acidic gases by the selective adsorption of the $CO_2$ which comprises the steps of:

(a) providing a fixed adsorption bed containing a

TABLE A

| Sample | Pressure, psia | Alpha, $CO_2/CH_4$ | $CO_2$ Adsorbed, g/100 g Adsorbent | $CH_4$ Adsorbed, g/100 g Adsorbent | Total $CO_2$ + $CH_4$ Adsorbed | Delta Loading, wt. - % | |
|---|---|---|---|---|---|---|---|
| | | | | | | $CH_4$ | $CO_2$ |
| A | 30 | 98.07 | 17.22 | 0.06 | 17.28 | 0.11 | 4.03 |
| A | 300 | 46.03 | 21.25 | 0.17 | 21.42 | | |
| B | 30 | 10.36 | 4.93 | 0.17 | 5.10 | 0.40 | 10.77 |
| B | 300 | 9.92 | 15.70 | 0.58 | 16.28 | | |
| C | 30.1 | 21.14 | 11.13 | 0.19 | 11.32 | 0.04 | 6.92 |
| C | 300 | 28.83 | 18.04 | 0.23 | 18.27 | | |
| D | 30 | 15.90 | 8.37 | 0.19 | 8.56 | 0.14 | 7.95 |
| D | 300 | 17.90 | 16.32 | 0.33 | 16.65 | | |
| E | 30.3 | 12.50 | 11.00 | 0.32 | 11.32 | 0.16 | 12.02 |
| E | 300 | 17.27 | 23.02 | 0.48 | 23.50 | | |
| F | 30.1 | 21.43 | 11.79 | 0.20 | 11.99 | 0.16 | 10.06 |
| F | 300 | 21.96 | 21.85 | 0.36 | 22.21 | | |
| G | 30 | 10.34 | 8.05 | 0.28 | 8.83 | 0.04 | 8.60 |
| G | 300 | 19.14 | 16.65 | 0.32 | 16.97 | | |
| H | 30.1 | 21.88 | 12.07 | 0.20 | 12.27 | 0.0 | 5.88 |
| H | 300 | 32.77 | 17.95 | 0.20 | 18.15 | | |

From the data of TABLE A, a number of significant facts can be discerned. Sample A, which is the sodium zeolite X adsorbent currently most often chosen for landfill gas pressure swing adsorption units, has a high selectivity factor (alpha=98 at 30 psia and 46 at 300 psia) but has a relatively low delta loading for $CO_2$ (4.03 wt. %). The high $CO_2$ loading at both 30 psia and 300 psia is indicative of an adsorbent with a "rectangular" isotherm. The silica gel sample (Sample B) activated at 200° C. produced improved $CO_2$ delta loading, but also produced increased $CH_4$ loadings. The $CH_4$ delta loading (0.40 wt. %) is quite high compared with all of the other adsorbents tested, and would be a distinct disadzeolitic molecular sieve of the faujasite type having a framework $SiO_2/Al_2O_3$ molar ratio of from 2 to 100 and containing at least 20 equivalent percent of one or a mixture of two or more cation species selected from the group consisting of zinc, rare earth, hydrogen and ammonium and containing not more than 80 equivalent percent of alkali or alkaline earth metal cations or mixtures thereof;

(b) passing said gas mixture into said bed at a temperature of from −50° C. to 100° C. and at a pressure of from 0.2 to 1000 psia whereby $CO_2$ is selectively adsorbed on said zeolite and recovering a gas product depleted with respect to $CO_2$;

(c) terminating the passage of said gas stream into said bed prior to the time of breakthrough of the $CO_2$ from the egress end thereof;

(d) regenerating the adsorption bed by desorbing $CO_2$ therefrom by decreasing the pressure in said bed to below the adsorption pressure of step (b) and to within the range of 0.1 to 500 psia, and;

(e) repeating steps (a) through (d).

2. Process according to claim 1 wherein the mixture of $CO_2$ and non-acidic gases comprises $CO_2$ and $CH_4$.

3. Process according to claim 1 wherein the mixture of $CO_2$ and non-acidic gases comprises $CO_2$ and $H_2$.

4. Process according to claim 1 wherein the mixture of $CO_2$ and non-acidic gases comprises $CO_2$ and $N_2$.

5. Process according to claim 1 wherein the $CO_2$ content of the gas mixture being treated is at least 5 mole percent, the framework $SiO_2/Al_2O_3$ ratio of the zeolitic molecular sieve is from 2 to 20 and the zeolitic molecular sieve contains at least 20 equivalent percent of one or a mixture of two or more of zinc, rare earth, hydrogen and ammonium cations.

6. Process according to claim 5 wherein the zeolitic molecular sieve contains at least 40 equivalent percent of one or a mixture of two or more of zinc, rare earth, hydrogen and ammonium cations and less than 40 equivalent percent of alkali and alkaline erth cations.

7. Process according to claim 6 wherein the mixture of $CO_2$ and non-acidic gases comprises $CO_2$ and $CH_4$.

8. Process according to claim 6 wherein the mixture of $CO_2$ and non-acidic gases comprises $CO_2$ and $H_2$.

9. Process according to claim 6 wherein the mixture of $CO_2$ and non-acidic gases comprises $CO_2$ and $N_2$.

* * * * *